Jan. 17, 1928. 1,656,323
C. B. GRAY
MACHINE FOR CUTTING SHEET FORM MATERIAL
Filed Dec. 22, 1924   10 Sheets-Sheet 4

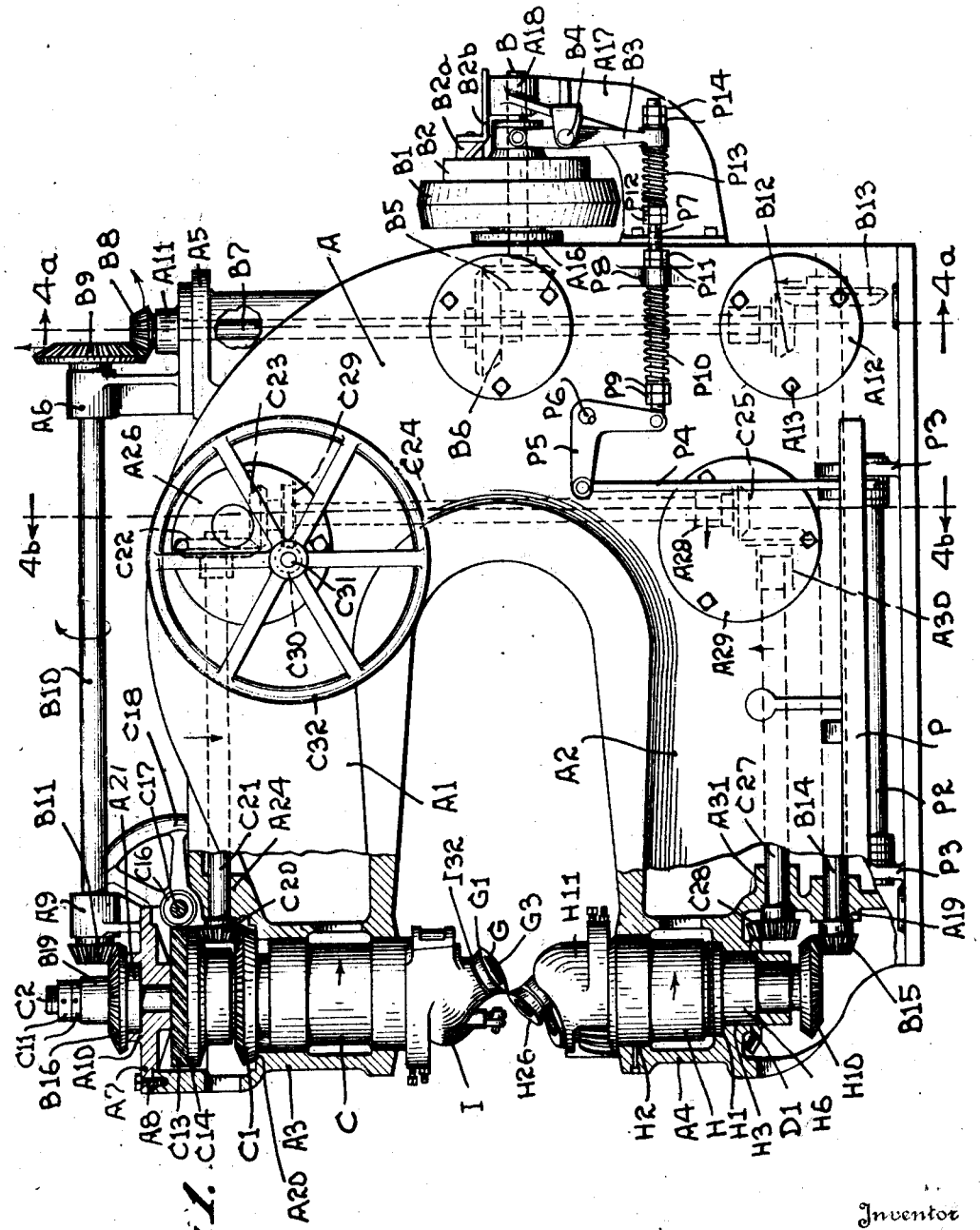

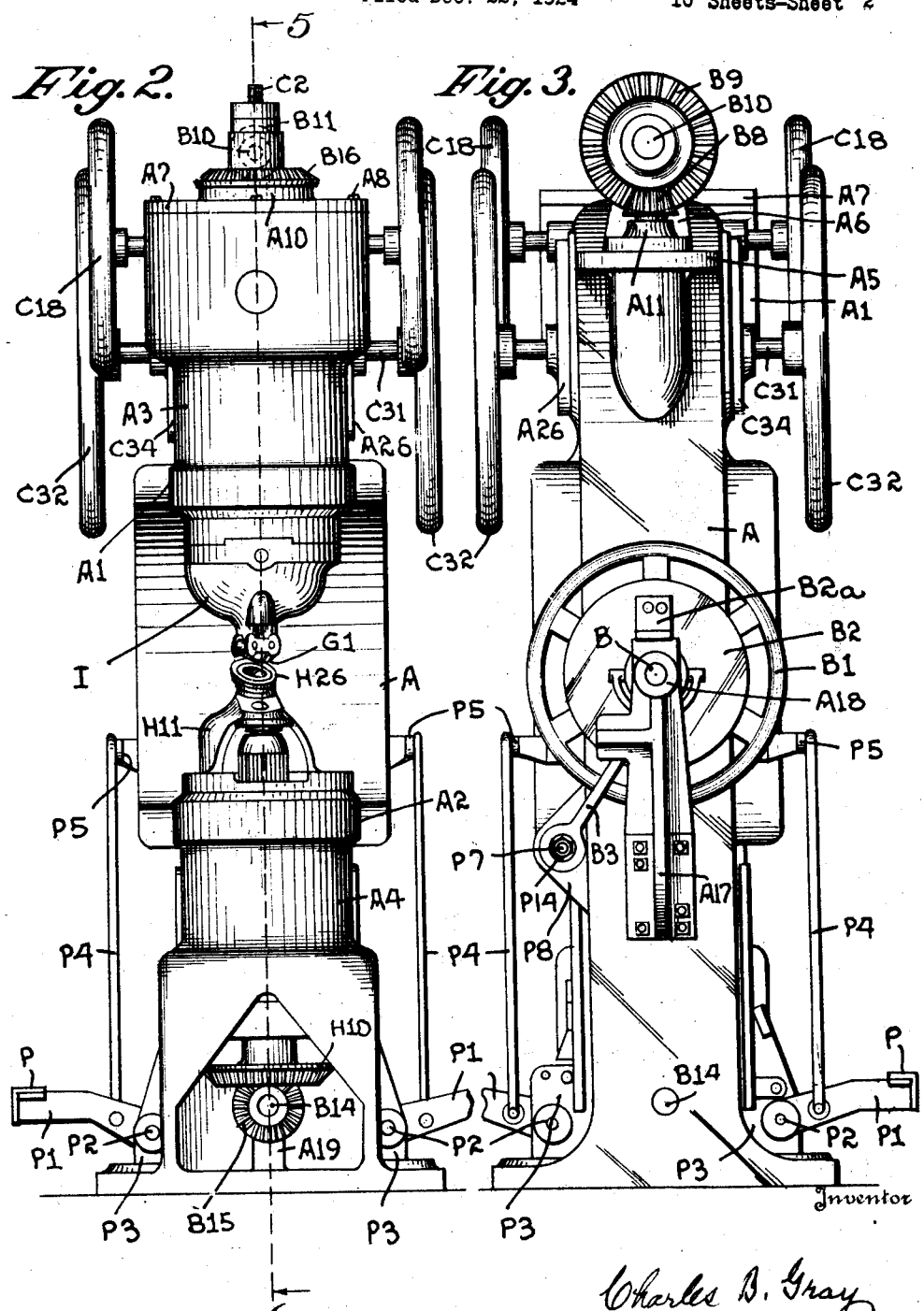

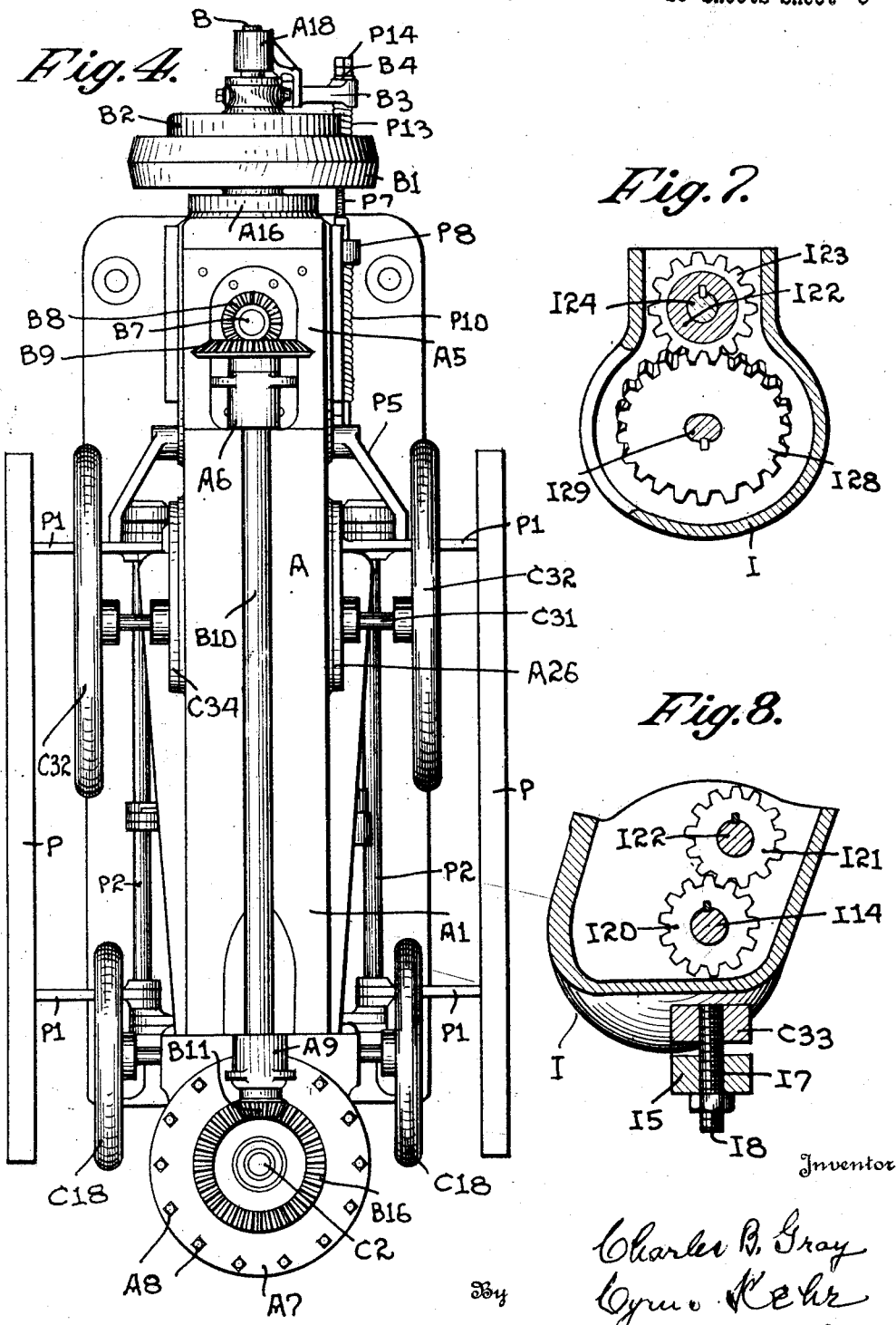

Inventor
Charles B. Gray
By Cyrus Kehr
Attorney

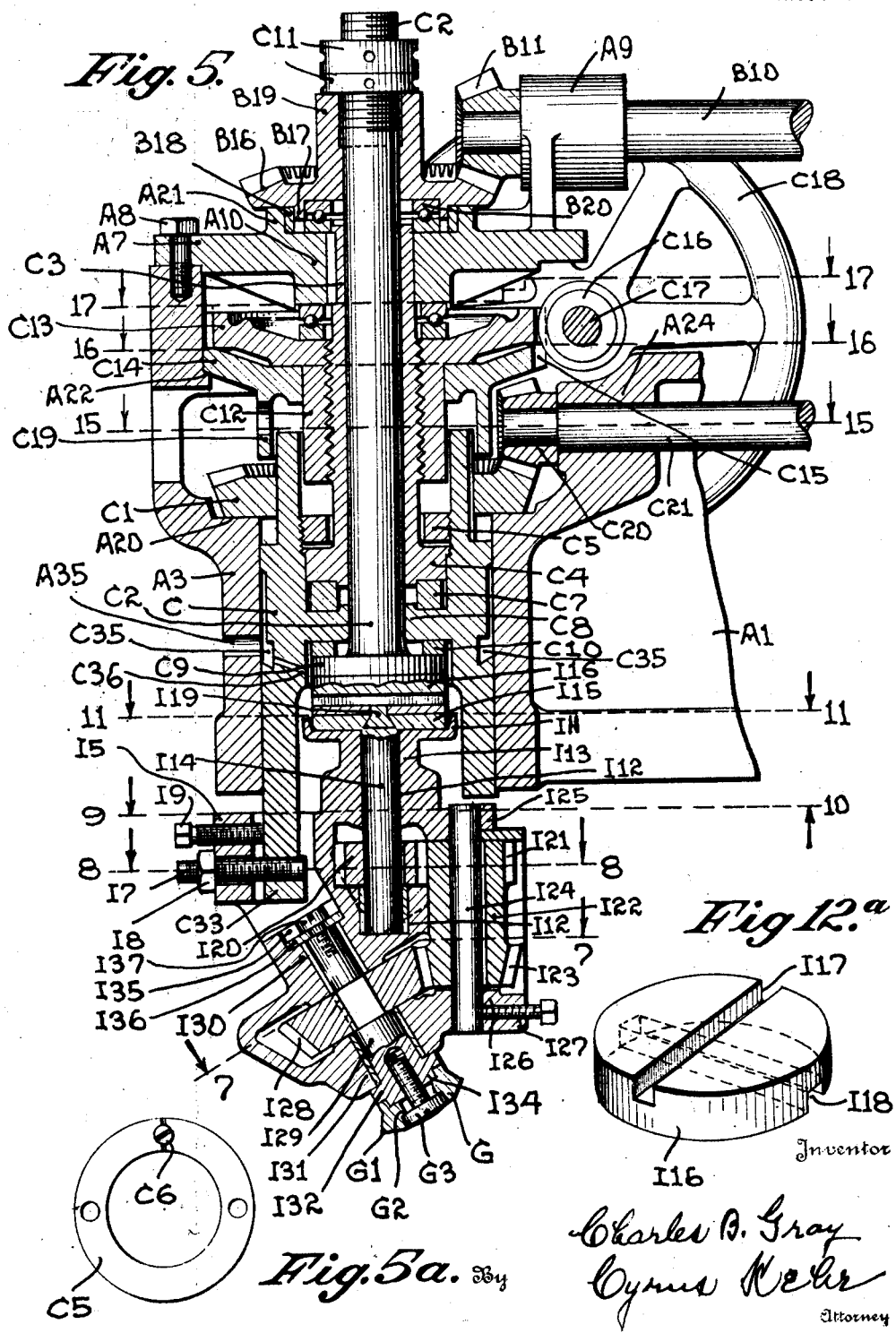

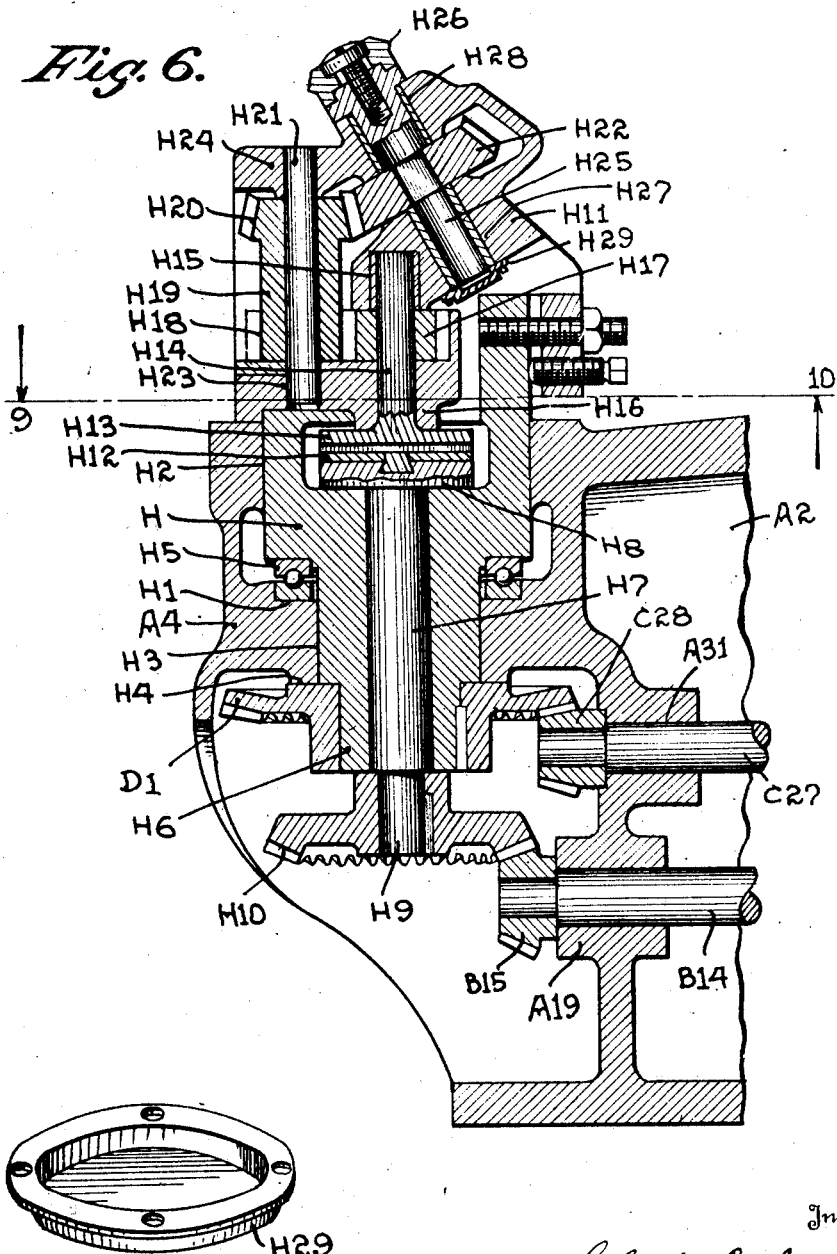

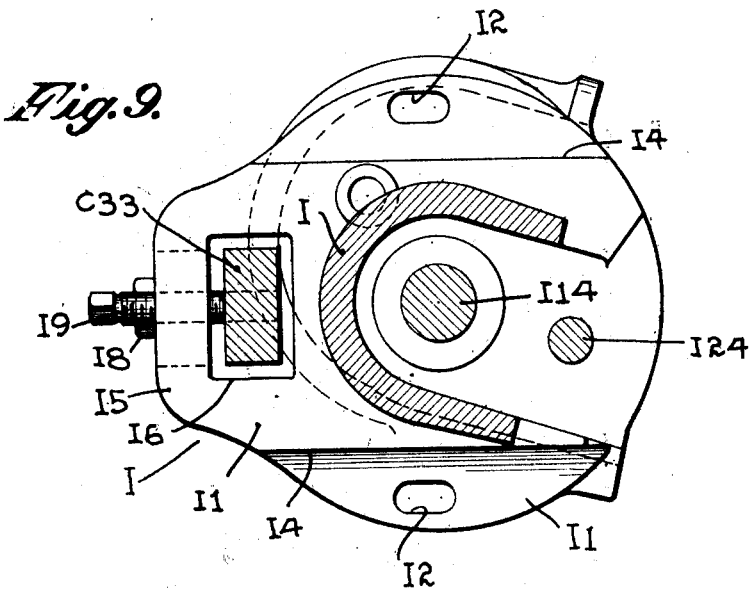
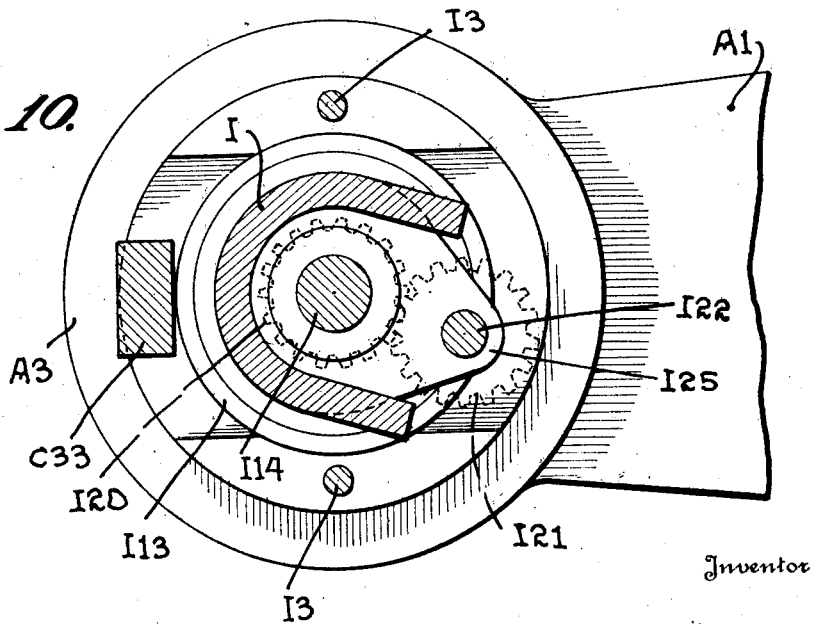

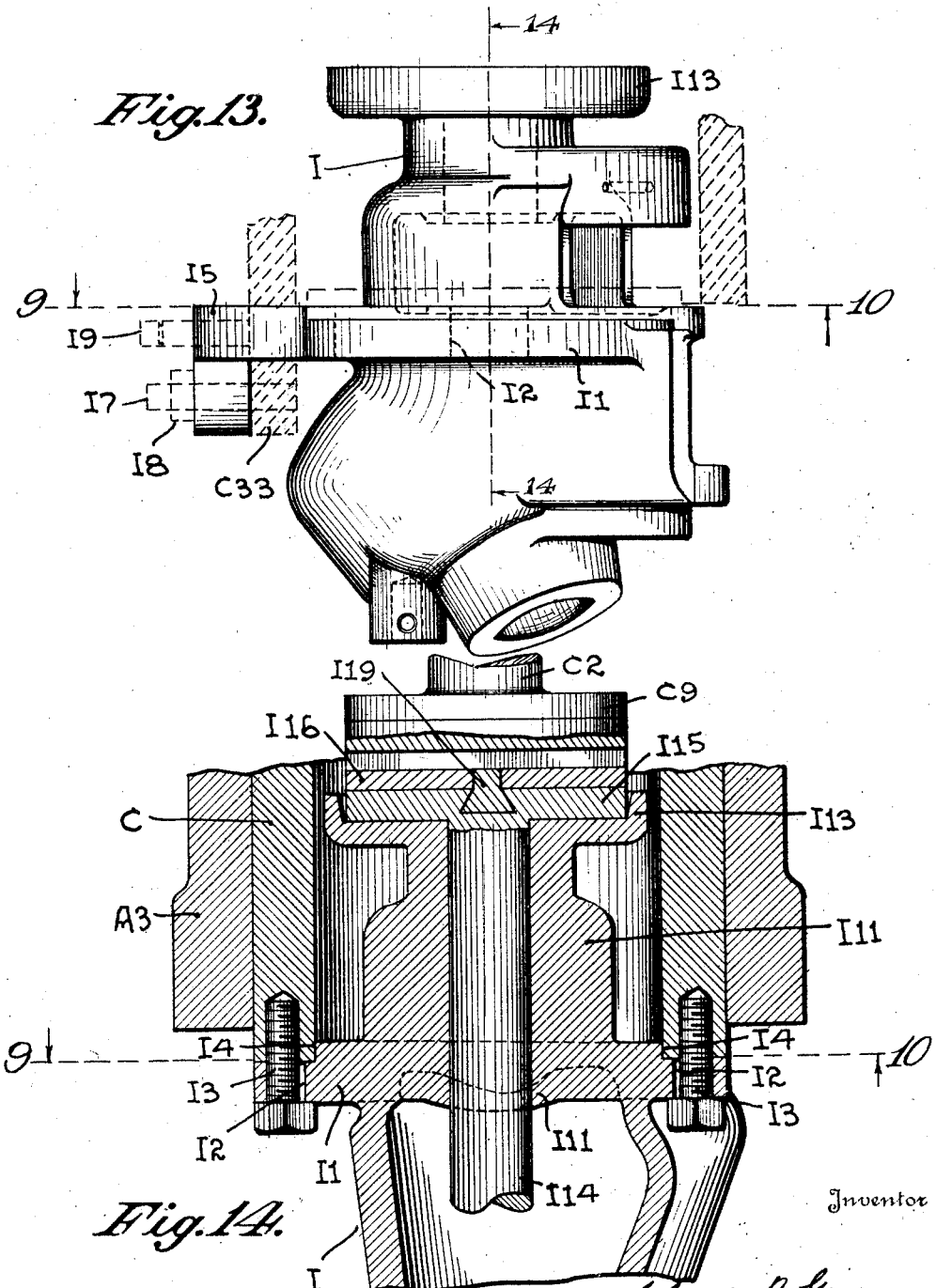

Jan. 17, 1928.
C. B. GRAY
1,656,323
MACHINE FOR CUTTING SHEET FORM MATERIAL
Filed Dec. 22, 1924 10 Sheets-Sheet 10
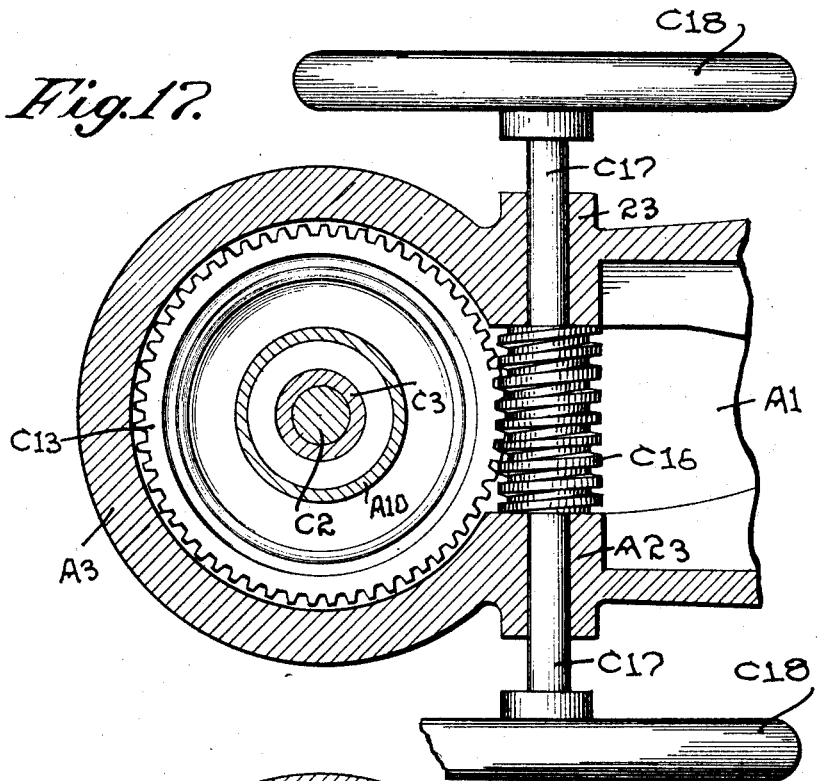
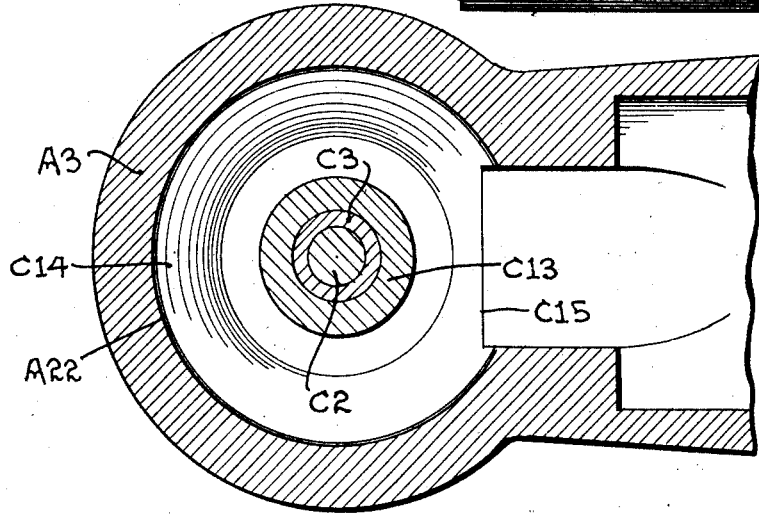

Patented Jan. 17, 1928.

1,656,323

UNITED STATES PATENT OFFICE.

CHARLES B. GRAY, OF PHILADELPHIA, PENNSYLVANIA.

MACHINE FOR CUTTING SHEET-FORM MATERIAL.

Application filed December 22, 1924. Serial No. 757,552.

This invention relates particularly to power-driven machines for shearing sheet metal, the machine including an upper and a lower wheel-form rotary cutter.

A machine of this general type is described in my Letters Patent of the United States, No. 1,381,088, dated June 7, 1921.

The object of this invention is to provide more compact and more definite construction of the turret mechanism and the mechanism for transmitting power through the turret structures to the shears.

In the accompanying drawings,

Fig. 1 is a front elevation of a machine embodying my improvement, parts being in section;

Fig. 2 is an end elevation looking at the machine from the left as shown in Fig. 1;

Fig. 3 is an end elevation looking at the machine from the right as shown in Fig. 1;

Figure 11:
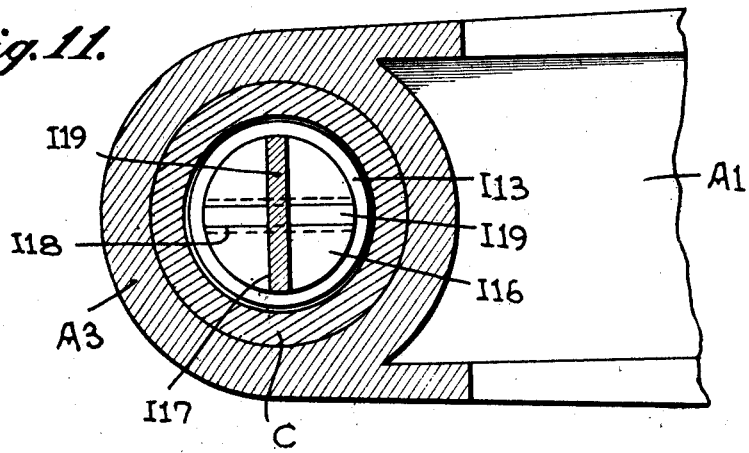
Figure 12:
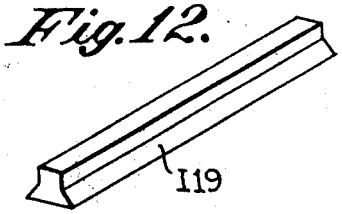

Fig. $4^a$ is an upright transverse section on the line, $4^a$—$4^a$, of Fig. 1, looking toward the right;

Fig. $4^b$ is an upright transverse section on the line, $4^b$—$4^b$, of Fig. 1, looking toward the left;

Fig. 5 is an upright section on the upper part of the line, 5—6, of Fig. 2, looking toward the left;

Fig. $5^a$ illustrates a retaining ring;

Fig. 6 is an upright section on the lower part of the line, 5—6, of Fig. 2, looking toward the left;

Fig. $6^a$ is a perspective of a cover to prevent the escape of oil;

Fig. 7 is an approximately horizontal section on the line, 7—7, of Fig. 5;

Fig. 8 is a horizontal section on the line, 8—8, of Fig. 5;

Fig. 9 is a horizontal section on the line, 9—10, of Figs. 5, 13 and 14, looking downward;

Fig. 10 is a horizontal section on the line, 9—10, of Figs. 5, 13 and 14, looking upward;

Fig. 11 is a horizontal section on the line, 11—11, of Fig. 5;

Fig. 12 is a perspective of one of the keys forming parts of the universal coupling;

Fig. $12^a$ is a perspective view of a member of the universal coupling.

Figure 4B:
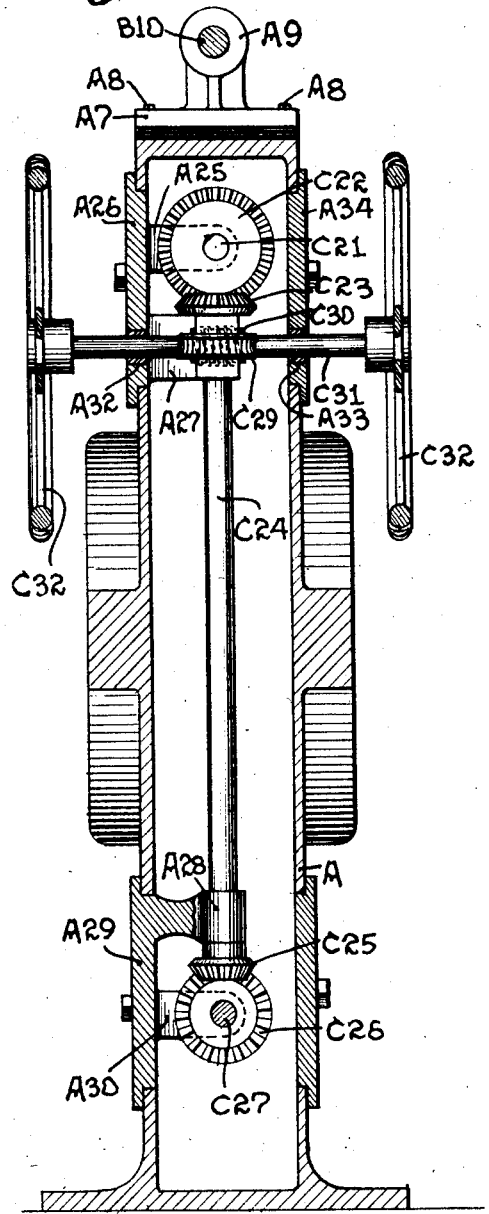
Fig. 4 is a plan of the machine as shown in Fig. 1.
Figure 4A:
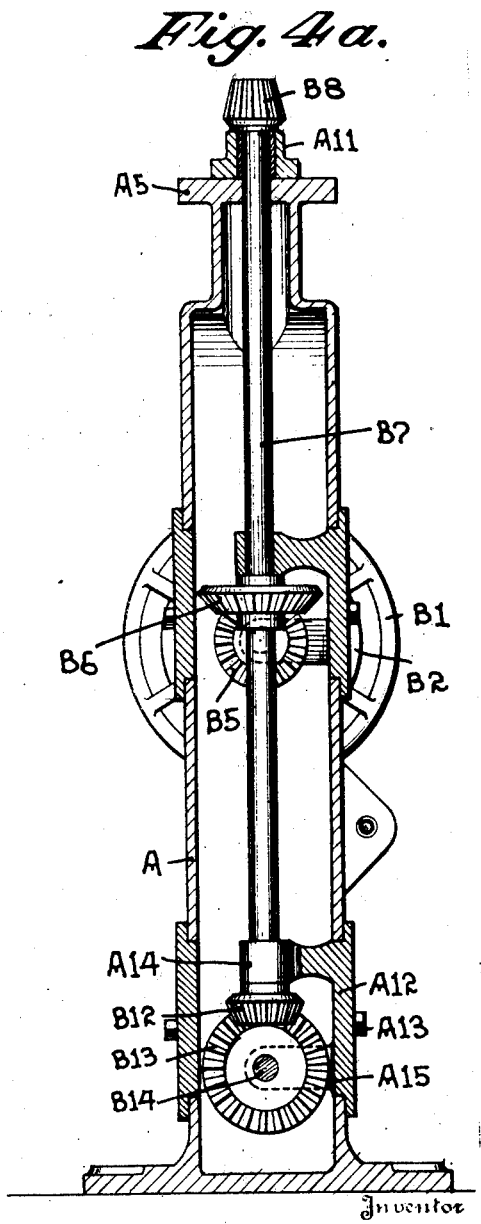
Figure 15:
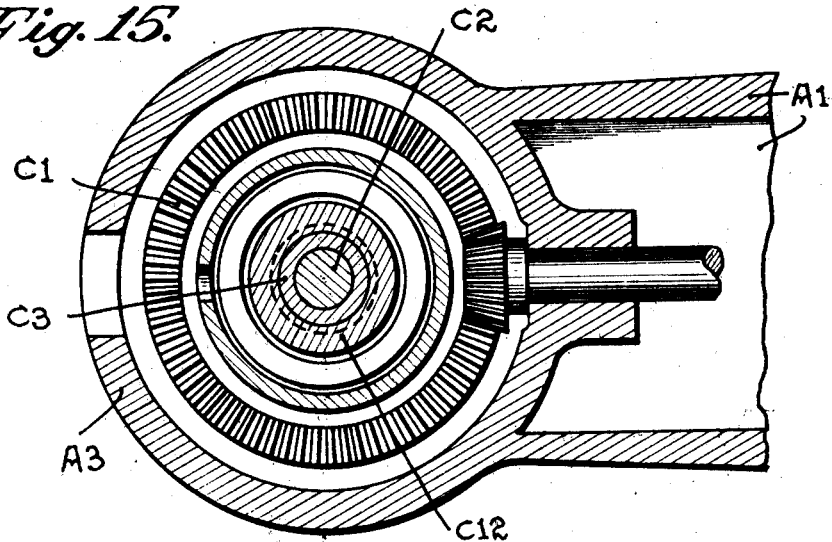

Fig. 13 is an elevation of a casting located in the lower part of the upper turret structure;

Fig. 14 is an upright section on the line, 14—14, of Fig. 13, looking toward the left;

Fig. 15 is a horizontal section on the line, 15—15, of Fig. 5;

Fig. 16 is a horizontal section on the line, 16—16, of Fig. 5;

Fig. 17 is a horizontal section on the line, 17—17, of Fig. 5.

Referring to said drawings, A is the frame of the machine. $A^1$ is the upper arm and $A^2$ is the lower arm of the frame. Between those arms is the throat of the machine. The frame is a casting, the greater part of which is hollow. On the end of the upper arm is the upright bearing, $A^3$, in which is supported the upper turret mechanism. Axially in line with the bearing, $A^3$, and on the end of the lower arm, $A^2$, is the bearing, $A^4$, in which is supported the lower turret mechanism.

On the upper part of the right hand end of the frame, A, is a bracket, $A^5$, on which is a horizontal bearing, $A^6$. On the upper part of the bearing, $A^3$, is a circular cap plate, $A^7$, which is secured to the bearing by means of cap screws, $A^8$. On the cap plate is a bearing, $A^9$, in horizontal alignment with the bearing, $A^6$, on the bracket, $A^5$. The cap plate, $A^7$, has a central upright bearing, $A^{10}$. On the bracket, $A^5$, is an upright bearing, $A^{11}$.

Near the lower right hand part of the frame is a front cap plate, $A^{12}$, seated over a corresponding opening in the front wall of the frame and secured by cap screws, $A^{13}$. On the upper part of the inner face of the cap plate is an upright bearing, $A^{14}$, in axial alignment with the bearing, $A^{11}$. On the lower part of the inner face of this cap plate is a bearing, $A^{15}$, which is horizontal and parallel to the front of the machine. In the left hand lower part of the frame is a bearing, $A^{16}$, in axial alignment with the bearing, $A^{15}$. In the right hand end of the frame approximately midway between the base of the machine and the bracket, $A^5$, is a horizontal bearing, $A^{16}$. On that end of the machine is a bracket, $A^{17}$, on the upper end of which is a bearing, $A^{18}$, in axial alignment with the bearing, $A^{16}$.

In the bearings, $A^{16}$ and $A^{18}$, is a horizontal main drive shaft, B. Between said bearings said shaft is surrounded by a loose pulley, $B^1$. A conical clutch member, $B^2$, surrounds and is feathered to the shaft, B, and adapted to fit into and engage the pulley, $B^1$. The member, $B^2$, is controlled by a pivoted clutch lever, $B^3$, said lever being fulcrumed on the bracket, $A^{17}$, at $B^4$. A bracket, $B^2b$, is fixed on the bearing, $A^{18}$, and supports immovably a brake block, $B^2a$, in position to meet the conical brake clutch member, $B^2$, when the latter is shifted away from the pulley member, $B^1$. This engagement stops rotation of the member, $B^2$, by momentum. The shaft, B, projects through the bearing, $A^{16}$, and has fixed thereon a bevel gear wheel, $B^5$, which meshes with a bevel gear wheel, $B^6$, which is fixed on the upright drive shaft, $B^7$, which rests in the bearings, $A^{11}$ and $A^{14}$. The upper end of the shaft, $B^7$, extends through the bearing, $A^{11}$. A bevel gear wheel, $B^8$, surrounds and is fixed to the upper end of said shaft and meshes with a bevel gear wheel, $B^9$, which is fixed on the right hand end of the shaft, $B^{10}$, which rests in the bearings, $A^6$ and $A^9$, and projects through said bearings. A bevel gear wheel, $B^{11}$, surrounds and is fixed to the left hand end of the shaft, $B^{10}$. A bevel gear wheel, $B^{12}$, surrounds and is fixed to the lower end of the shaft, $B^7$, and meshes with a bevel gear wheel, $B^{13}$, which is fixed on the right hand end of the shaft, $B^{14}$, which rests in the bearings, $A^{15}$ and $A^{19}$. On the left hand end of the shaft, $B^{14}$, is fixed the bevel gear wheel, $B^{15}$, which meshes with a bevel gear wheel, $H^{10}$, through which motion is imparted to the lower cutter. The bevel gear wheels, $B^8$ and $B^{12}$, are of the same size and the bevel gear wheels, $B^9$ and $B^{13}$, are of the same size. Hence rotation of the shaft, B, will rotate the shaft, $B^7$, and that will cause the rotation of the horizontal drive shafts, $B^{10}$ and $B^{14}$, at the same velocity and in the same direction.

The bevel gears, $B^{11}$ and $B^{15}$, are used to transmit power to two shafts which extend through the turrets and are connected by gearing to the shearing knives or cutters, G and $H^{26}$.

The upper turret body, C, rests in the turret bearing, $A^3$, and is rotatable therein, as will be described further on. The upper part of the bearing, $A^3$, is expanded to form an annular shoulder, $A^{20}$, on which rests a bevel gear wheel, $C^1$, which surrounds the turret body and is feathered or splined thereon to compel rotation of the turret body with said wheel and to permit the turret body to slide endwise in the wheel when the turret body is raised or lowered as described further on. (Figs. 1 and 5).

On the upper face of the cap plate, $A^7$, is an upward directed annular flange, $A^{21}$, concentric with the turret axis. Above said flange is a bevel gear wheel, $B^{16}$, which has an annular flange, $B^{17}$, concentric with said axis and of smaller diameter than the annular flange, $A^{21}$. Between the flanges, $A^{21}$ and $B^{17}$, is a bushing, $B^{18}$. Between the wheel, $B^{16}$, and the cap plate, $A^7$, is a roller bearing, $B^{20}$, said bearing being surrounded by the flange, $B^{17}$, and being somewhat larger than the diameter of the shaft, $C^2$. The bevel wheel, $B^{16}$, has its teeth directed upward and meshing with the bevel gear wheel, $B^{11}$, which has already been described as receiving motion through the upper horizontal drive shaft, $B^{10}$. Thus the wheel, $B^{16}$, receives motion from the wheel, $B^{11}$. The wheel, $B^{16}$, has an upward extended hub or neck, $B^{19}$. A shaft, $C^2$, extends downward through the hub, $B^{19}$, and the wheel, $B^{16}$, and into the lower part of the upper turret body, C. The wheel, $B^{16}$, and the hub, $B^{19}$, are splined on the shaft, $C^2$, to compel rotation of the shaft with the wheel and to permit sliding of the shaft in the wheel. Said shaft has a bearing in a sleeve, $C^3$, which extends through the cap plate, $A^7$, and downward nearly to the middle of the length of the turret body. The lower part of said sleeve is expanded to form an annular flange, $C^4$, immediately above which is a ring, $C^5$, exteriorly threaded to engage corresponding threads on the interior of the turret body. Said ring is split transversely at one side of the sleeve and bored and threaded to receive a tapering screw, $C^6$, by which said ring is forcibly spread to maintain locked engagement in the turret body. (See Fig. 5a). The function of said ring is to hold the flange, $C^4$, against upward movement, whereby said sleeve is held against upward movement independently of the turret body, C. The threading on the interior of the turret body is extended downward far enough to allow downward adjustment of the ring to compensate for any wear that may take place. Below the flange, $C^4$, is a thrust ring, $C^7$, which rests on the transverse wall of the turret body and bears against the flange, $C^4$, of the sleeve, $C^3$. This thrust ring may be removed and a new one put into its place if that is required by wearing. It will be understood that this ring might be omitted altogether and the flange, $C^4$, made to rest on the transverse wall of the turret body. The upper end and the lower end of the sleeve fit closely to form bearings for said shaft.

Below the ring $C^7$, the turret body forms a bearing $C^8$, for the shaft, $C^2$. Below said bearing the interior of the turret body is expanded and a head, $C^9$, is formed on the shaft, $C^2$. Above said head is a thrust ring, $C^{10}$, which bears against said head and the transverse wall above said head. Said ring takes upward thrust when there is upward pressure tending to move said shaft upward.

Above the hub, $B^{19}$, the shaft, $C^2$, is screw threaded and surrounded by two jam nuts, $C^{11}$. The lower of these nuts normally rests on the upper end of the sleeve, $B^{19}$. These nuts serve as a stop to limit downward movement of the turret body. By adjusting these nuts, the limit on the downward movement of the turret body and the cutter carried by that body may be varied.

Between its ends, the sleeve, $C^3$, is exteriorly threaded to fit into a correspondingly threaded hub $C^{12}$, of a worm gear wheel, $C^{13}$, which rests on the annular supporting plate, $C^{14}$, which surrounds and forms a bearing for the hub, $C^{12}$, and has its edge resting on the shoulder, $A^{22}$, formed on the wall of the bearing, $A^3$. (See Figs. 5 and 17). The right hand part of the plate, $C^{14}$, is cut away at $C^{15}$, to make room for the gear worm, $C^{16}$, which meshes with the worm wheel, $C^{13}$. This gear worm is fixed on the horizontal shaft, $C^{17}$, which rests in bearings, $A^{23}$. (Fig. 17). Each end of the shaft, $C^{17}$, projects through the adjacent bearing, $A^{23}$, and has fixed thereon a hand wheel, $C^{18}$, which may be turned for turning said shaft and the gear worm, whereby the gear wheel, $C^{13}$, and the hub, $C^{12}$, are turned an the sleeve, $C^3$, whereby that sleeve is raised or lowered according to the direction in which the worm wheel, $C^{13}$, is turned. If the sleeve, $C^3$, is moved upward, the flange, $C^4$, will engage the ring, $C^5$, and force said ring and the turret body, C, upward. Thus all parts supported by said body are lifted. If the sleeve is moved downward, the flange, $C^4$, will bear downward on the thrust ring, $C^7$, and cause the latter to bear downward upon the transverse wall of the turret body, whereby said body is forced downward. This up-and-down movement of the turret body is for the purpose of raising and lowering the upper rotary shear knife, G, relative to the sheet which is to be cut. The jam nuts, $C^{11}$, on the upper part of the shaft, C, are to be so adjusted on said shaft, $C^2$, as to arrest downward movement when turning the hand wheel, $C^{18}$, has caused the downward movement of the upper cutter, G, into the proper elevation relative to the lower cutter. This provision is specially useful when an inside cut on a sheet is to be made. Then the upper cutter is raised to allow the insertion of the sheet. Then the cutter is driven down into the working position. That is reached when the jam nuts bear on the neck, $B^{19}$. The working position of the upper cutter depends upon the thickness of the sheets which are to be cut. If said sheets are quite thin, the upper knife is to be moved downward correspondingly near the lower knife, $H^{26}$. If the sheet to be cut is thick, the knives, G, and $H^{26}$, are to be set correspondingly further from each other. It is to be observed that this up-and-down adjustment of the turret body is to be performed manually, the operator turning either hand wheel, $C^{18}$, according to the side at which he may be standing. And it is to be noted that this worm gearing and the shaft, $C^{17}$, and the sleeve, $C^{13}$, constitute mechanism for raising and lowering the turret body in the turret bearing, $A^3$.

The bevel gear wheel, $C^1$, is splined on the upper end of the turret body, C, so that said wheel may remain seated on the shoulder, $A^{20}$, during the up-and-down movements of the turret body which have just been described. To aid the wheel, $C^1$, to remain seated, an annular flange, $C^{19}$, extends downward from the plate, $C^{14}$, and overlaps the upper end of the turret body and reaches nearly to the upper face of the wheel, $C^1$. The wheel, $C^1$, being, as above described, splined on the turret body, when the wheel is turned, the entire turret body is correspondingly turned, together with all parts supported by the lower part of the turret body. This includes the mechanism for supporting and rotating the upper knife, G.

The bevel gear wheel, $C^1$, meshes with the bevel gear wheel, $C^{20}$, fixed on the left hand end of the horizontal shaft, $C^{21}$, which end rests in a bearing, $A^{24}$. The right hand end of said shaft rests in a bearing, $A^{25}$, formed on a cap plate, $A^{26}$, which forms a part of the front wall of the frame, A. On the adjacent end of the shaft, $C^{21}$, is a bevel gear wheel, $C^{22}$, which meshes with a bevel gear wheel, $C^{23}$, on the upright shaft, $C^{24}$, the upper end of which rests in a bearing, $A^{27}$, on the cap plate, $A^{26}$. The lower end of the shaft, $C^{24}$, rests in a bearing, $A^{28}$, on the cap plate, $A^{29}$, forming a part of the front wall of the machine frame. On the lower end of said shaft is a bevel gear wheel, $C^{25}$, which meshes with a bevel gear wheel, $C^{26}$, fixed on the right hand end of the shaft, $C^{27}$, the right hand end of which rests in the bearing, $A^{30}$, on the inner face of the cap plate, $C^{20}$. The left hand end of said shaft rests in a bearing, $A^{31}$, and projects through said bearing and has fixed thereon a bevel gear wheel, $C^{28}$, which meshes with a bevel gear wheel, $D^1$, which is concerned with the turning of the lower turret body, as will be described further on. Between the bearing, $A^{27}$, and the bevel gear wheel, $C^{23}$, a worm gear wheel, $C^{29}$, surrounds and is fixed to the shaft, $C^{24}$. A gear worm, $C^{30}$, fixed on the shaft, $C^{31}$, meshes with the worm gear wheel. The shaft, $C^{31}$, is horizontal and transverse to the frame, A, and rests in a bearing, $A^{32}$, on the cap plate, $A^{26}$, and in a bearing, $A^{33}$, on the rear cap plate, $A^{34}$. Said cap plate is applied to the rear wall of the frame the same as the cap plate, $A^{26}$, is applied to the front wall of the frame. The ends of the shaft, $C^{31}$, project through the bearings, and on each end is fixed a hand wheel, $C^{32}$, by which the operator may turn the shaft, whereby the gear worm will turn the worm gear wheel, whereby the upright shaft, $C^{24}$, is turned. The turning of said shaft causes the turning of the shafts, $C^{21}$, and $C^{27}$, through the bevel gears at each end of the shaft, $C^{24}$. Turning the shafts, $C^{21}$, and $C^{27}$, causes the turning of bevel gear wheels, $C^1$ and $D^1$, whereby the turret bodies are turned simultaneously and in the same direction. By this means the knives, G and $H^{26}$, are turned around the turret axis, whereby the direction of the feed of the knives is changed.

The mechanism by which the upper knife, G, is supported and given rotation from the shaft, $C^2$, will now be described. In this connection let it be kept in mind that this knife is to be given horizontal adjustment as well as the up and down adjustment which, as already described, is effected by up and down adjustment of the turret body. Accordingly the mechanism for transmitting motion from the shaft, $C^2$, to the knife, G, includes a universal coupling which permits lateral movement of the knife supporting mechanism without destroying the transmission from the shaft, $C^2$, to the knife. In the form shown in the drawings, this universal coupling is what is known in the art, as an Oldham coupling.

The knife, G, and the gearing mechanism for transmitting motion from the shaft, $C^2$, to the knife are supported in the housing, I, which is shown in elevation in Fig. 13 and is supported by the lower end of the turret body, C, the housing being normally held immovably on the turret body, but provision being made for shifting the housing sidewise on the turret body by the operator when it is desired to adjust the knife, G, sidewise.

The turret body and the housing, I, engage each other in the horizontal plane indicated by the line, 9—10, of Figs. 5, 13 and 14. Fig. 9 is a view looking downward, a section having been made on the line, 9—10. The part of the housing above the line, 9—10, extends into the turret body. Fig. 10 is a section along the same plane, looking upward.

Below the plane of the line, 9—10, the body or housing, I, has a cross wall, $I^1$, which extends across the lower end of the turret body, C, and has slots, $I^2$, placed under the turret body wall diametrically opposite and parallel to each other. A cap bolt, $I^3$, extends upward through each of said slots and is threaded into the turret body. By this means, the body or housing, I, is bound immovably to the lower end of the turret body. When said cap screws have been slightly loosened, the housing may be shifted in the direction of the length of the slots, $I^2$. To aid in confining this shifting to a direct line, the wall, $I^1$, the middle part of the wall, $I^1$, is raised to present upright shoulders, $I^4$, parallel to each other and to the slots, $I^2$. The lower end of the turret body is cut away correspondingly to receive this raised part of said wall and bear against said shoulders. On a line parallel to the shoulders, $I^4$, and on a line cutting the axis of the housing, the wall, $I^1$, has a lateral extension, $I^5$, in which is a rectangular opening, $I^6$, large enough to receive a downward-directed lug, $C^{33}$, formed on the lower end of the turret body. The opening, $I^6$, is larger than said lug, in order to permit the above-mentioned lateral movement of the housing. The extension, $I^5$, is extended downward at the side of the opening, $I^6$, which is the farther from the axis of the housing. A bolt, $I^7$, extends slidably and horizontally through said lower extension and is threaded into the lug, $C^{33}$. On the outer end of said bolt is a nut, $I^8$. By driving said nut toward the housing, the housing is driven horizontally in the same direction. the cap bolts, $I^3$, having been slightly loosened. If the nut, $I^8$, is turned in the reverse direction, the housing is free to be moved in the reverse direction. That is accomplished by turning the set bolt, $I^9$, which is threaded through the extension, $I^5$, above the bolt, $I^7$. Turning the bolt, $I^9$, forward causes it to bear against the lug, $C^{33}$, whereby the housing is drawn in the opposite direction. Then the nut, $I^8$, on the bolt, $I^7$, is to be turned forward to bear against the extension, $I^5$, whereby the housing is held against movement in either direction. As above stated, this lateral movement is for the purpose of giving the knife, G, precise horizontal positioning. When that has been accomplished, the cap screws, $I^3$, are to be again tightened to firmly hold the housing on the turret body.

From the wall, $I^1$, the housing is extended upward into the turret body toward the shaft, $C^2$, to form an upright bearing, $I^{11}$. Below the level of the cross wall, $I^1$, is a bearing, $I^{12}$, in alignment with the bearing, $I^{11}$, and of the same diameter.

Around the upper end of the bearing, $I^{11}$, is an annular rim, $I^{13}$. A transmission shaft, $I^{14}$, rests in the bearings, $I^{11}$ and $I^{12}$, and has on its upper end a head, $I^{15}$, which rests within the rim, $I^{13}$. Said head is the lower member of an Oldham universal coupling. The middle member, $I^{16}$, of this coupling (Fig. 12ᵃ) engages the head, $I^{15}$, and the corresponding head, $C^9$, on the lower end of the shaft, $C^2$. The middle member, $I^{16}$, has in its upper face a horizontal channel, $I^{17}$, and in its lower face a similar channel, $I^{18}$, which is placed crosswise of the channel, $I^{17}$. Tongues, $I^{19}$, seated on the heads, $I^{15}$ and $C^{34}$, extend into said channels. This type of coupling is well known and does not need further description. It forms a means for transmitting motion from the shaft, $C^2$, to the shaft, $I^{14}$, when said shafts are in axial alignment and also when the housing has been shifted laterally to bring the shaft, $I^{14}$, out of axial alignment with the shaft, $C^2$.

Between the bearings, $I^{11}$ and $I^{12}$, the housing is chambered to make room for a spur gear wheel, $I^{20}$, surrounding and rotatable with the shaft, $I^{14}$.

The spur gear wheel, $I^{20}$, meshes with a spur gear wheel, $I^{21}$, which is integral with the upper end of the upright sleeve, $I^{22}$. A fixed axle, $I^{24}$, extends through the sleeve, $I^{22}$, and has its upper end resting in a bearing, $I^{25}$, and has its lower end resting in a bearing, $I^{26}$. A set screw, $I^{27}$, extends through the wall of the bearing, $I^{26}$, and presses against the axle, $I^{24}$, to immovably hold said axle. Integral with the sleeve, $I^{22}$, is a bevel pinion, $I^{23}$, which meshes with a bevel pinion, $I^{28}$, which surrounds and is immovably held on the inclined shaft, $I^{29}$, the portion of said shaft within said pinion being squared to compel the shaft to rotate with the wheel. Said shaft rests in an upper bearing, $I^{30}$, and a lower bearing, $I^{31}$. On the lower end of the shaft, $I^{29}$, is a head, $I^{32}$. On the lower end of the head, $I^{32}$ is a cylindrical neck, $I^{34}$. The annular-form cutter or knife, G, is seated on the lower end of said neck and also surrounds said neck. A binding screw, $G^3$, extends through the cutter into the shaft, $I^{29}$, and has its head resting on a shoulder, $G^2$, on the knife. Thus the cutter is held immovably on the inclined shaft and compelled to rotate with said shaft. The cutter has the annular cutting edge, $G^1$. Above the bearing, $I^{30}$, the casting or housing, I, has a recess, $I^{35}$, concentric with the axis of said bearing. A washer, $I^{36}$, rests in said recess and against the upper end of the inclined shaft. A binding screw, $I^{37}$, extends through said washer and into said shaft and binds the washer to the shaft. Thus said shaft is held against downward movement. The head, $I^{32}$, holds the shaft against upward movement. The shaft, $I^{29}$, is inclined about thirty degrees to the upright shaft or axle, $I^{24}$.

By reference to Figs. 5, 7, 8, 9, 10 and 13, it will be seen that the body, I, has side openings for the insertion of the several cog wheels. After these wheels have been put into place, their shafts are to be inserted.

At about the level of the lower end of the shaft, $C^2$, the bearing, $A^3$, has an oil port, $A^{35}$, which registers with a trough-form channel formed horizontally around the exterior of the turret body, C. An oil port, $C^{36}$, extends from said channel obliquely downward into the interior of the turret body adjacent the Oldham coupling. Oil inserted through the port, $A^{35}$, enters the channel, $C^{35}$, in whatever position the turret body may have been turned. Oil passing downward through the port, $C^{36}$, reaches the members of the coupling and also enters the space within the flange, $I^{13}$, which is inclined outward to facilitate receiving the oil. Thence the oil can flow downward through the bearing, $I^{11}$, and around the gear wheel, $I^{20}$, and into the bearing, $I^{12}$.

Referring now to Figs. 1, 2 and particularly 6, the lower turret mechanism and the lower cutter mechanism will be explained.

These mechanisms are substantially the same as the upper turret mechanism and the upper cutter mechanism excepting that the parts of the lower mechanisms are inverted with reference to the upper mechanisms, whereby the cutter, $H^{26}$, is brought to the cutter, G. The bearing, $A^4$, has a horizontal annular shoulder, $H^1$. Above said shoulder this bearing has an upright face, $H^2$, and below said shoulder, said bearing has an upright face, $H^3$, each of said faces being concentric to the bearing axis. Below the face, $H^3$, said bearing has a horizontal annular face, $H^4$. The turret body, H, is seated rotatably in the bearing, $A^4$. The upper part of said body is of sufficient diameter to bear against the interior face, $H^2$, and to rest on a roller bearing, $H^5$, which rests on the shoulder, $H^1$. Below said shoulder, the body, H, is of reduced diameter to meet the interior face, $H^3$. This part of the body extends downward even with the lower face, $H^4$, of the bearing, $A^4$. Below said face, the body is further contracted to form a cylindrical neck, $H^6$, which extends downward even with the lower end of the hub of the bevel gear wheel, $D^1$, and which is keyed to said neck and which, as already described, meshes with and takes motion from the bevel gear pinion, $C^{28}$, which receives motion from the shaft, $C^{27}$, for turning the turret body for changing the direction of feed of the two cutting wheels, the lower turret body and the upper turret body being turned simultaneously and synchronously and in the same direction. The shaft, $H^7$, which corresponds to the shaft, $C^2$, of the upper mechanism is seated for rotation in the turret body, H. The upper end of the turret body is chambered to make space for an Oldham coupling like the Oldham coupling of the upper turret mechanism. The head, $H^8$, on the upper end of the shaft, $H^7$, forms the lower member of said coupling. Said head rests on the horizontal face of the turret body at the upper end of said shaft. The shaft, $H^7$, extends below the neck, $H^6$, of the turret body, and that part of the shaft is contracted to form a neck, $H^9$, which is surrounded by and keyed to the bevel gear wheel, $H^{10}$, which, as already described, meshes with the bevel pinion, $B^{15}$, which receives motion from the shaft, $B^{14}$, which, as already described, is rotated simultaneously with the upper horizontal shaft, $B^{10}$, through which motion is imparted to the upper shaft, $C^2$.

On the upper end of the turret body, H, is the housing, $H^{11}$, which is like the housing, I, of Figs. 5, 13 and 14, excepting that it is inverted. This housing, $H^{11}$, is joined to the turret body, H, the same as has been described in connection with the turret body, C, and the housing, I. A section taken on the line, 9—10, of Fig. 6, looking downward would be the same as the section which forms Fig. 10; and a section taken on the line, 9—10, of Fig. 6, looking upward, would be the same as the section, Fig. 9. Above the head, $H^8$, there is the middle coupling member, $H^{12}$; and above that member is the upper coupling member which is a head, $H^{13}$, formed on the shaft, $H^{14}$, which rests in bearings, $H^{15}$ and $H^{16}$. Between said bearings said shaft is surrounded and keyed to a spur gear wheel, $H^{17}$, which meshes with a spur gear wheel, $H^{18}$, which is integral with the sleeve, $H^{19}$, which is integral with a bevel gear wheel, $H^{20}$, which meshes with the bevel gear wheel, $H^{22}$. A shaft, $H^{21}$, extends through the gear wheels, $H^{18}$ and $H^{20}$, and the sleeve, $H^{19}$, and has its ends resting in a lower bearing, $H^{23}$, and in an upper bearing, $H^{24}$. A wheel, $H^{22}$, surrounds the inclined shaft, $H^{25}$, which is like the shaft or axle, $I^{24}$, of the upper structure. The lower cutter or shearing knife, $H^{26}$, is like the upper cutter or shearing knife, G, and is similarly attached to the inclined shaft, $H^{25}$, and said shaft is similarly seated in bearings, $H^{27}$ and $H^{28}$. A cover, $H^{29}$, shown by Figs. 6 and $6^a$ extends over the lower end of the bearing, $H^{27}$, and is secured to the housing by means of screws. This cover prevents the flow of oil out of said bearing.

The clutch lever, $B^3$, is controlled by either one of two pedals, P, one of which is placed at each side of the machine and horizontal and parallel to the side of the machine and supported on arms, $P^1$, which are rigid on an adjacent rock shaft, $P^2$, which rests in bearings, $P^3$. Between each pedal and the adjacent rock shaft, $P^2$, the lower end of a link, $P^4$, is attached to the arm, $P^1$, which is the nearer the clutch mechanism. The upper end of the front link, $P^4$, is coupled to the horizontal arm of a bell crank, $P^5$, which is mounted immovably on the adjacent end of a rock shaft, $P^6$, which extends horizontally through the frame of the machine. The other arm of the bell crank extends downward and is coupled to one end of a horizontal slide rod, $P^7$. Said rod extends slidably through a bearing, $P^8$, formed on the front face of the machine frame. The other end of said rod extends slidably through the lower end of the clutch lever, $B^3$. Adjacent the bell crank, said rod is surrounded by two nuts, $P^9$. Between those nuts and the bearing, $P^8$, the rod is surrounded by an expanding coiled spring, $P^{10}$. By driving said nuts toward the bearing, $P^8$, the spring is compressed and caused to press the nuts leftward for tilting the bell crank to lift the link, $P^4$, and the adjacent pedal, P. Thus the pedal is normally in the elevated position. This movement also causes the rod, $P^7$, to draw the lower end of the clutch lever leftward, whereby the inner clutch member, $B^2$, is drawn away from the pulley, $B^1$, whereby the communicating of power from the pulley, $B^1$, to the clutch, $B^2$, ceases. Leftward movement of the rod, $P^7$, is limited by two nuts, $P^{11}$, placed at the right of the bearing, $P^8$. These nuts may be turned for varying their position on said rod. Between the nuts, $P^{11}$, and the clutch lever, $B^3$, are two nuts, $P^{12}$. Between those nuts and said lever is an expanding coiled spring, $P^{13}$, which presses against said lever and against the nuts, $P^{12}$, and tends to move said rod leftward through the end of the clutch lever. At the right of the clutch lever, two nuts, $P^{14}$, are threaded around said rod to limit the leftward movement of the rod through said arm. Said nuts may be turned on said rod to vary their engagement with the clutch lever, whereby the normal position of the rod relative to the clutch lever is varied, whereby the time of release of the inner clutch member is varied. At the rear of the machine, an arm, $P^{15}$, takes the place of the bell crank, $P^5$, on the shaft, $P^6$, and has its outer end coupled to the upper end of the link, $P^4$. By placing a pedal at the front and at the rear of the machine, the operator can control the clutch when he is standing at the front or at the rear of the machine. Depressing either pedal will engage the clutch mechanism and cause the transmission of motion to the shearing knives, G and $H^{26}$.

I claim as my invention:

1. In a machine of the kind described, the combination of two turrets on a common axial line, cutting means on each of said turrets, means consisting of shafts and cog gearing for turning said turrets in unison, and operator-controlled means for turning one of said shafts, substantially as described.

2. In a machine of the kind described, the combination of two turrets on a common axial line, cutting means on each of said turrets, means consisting of shafts and cog gearing for turning said turrets in unison, and operator-controlled worm gearing for turning one of said shafts, substantially as described.

3. In a machine of the kind described, the combination of two turrets on a common axial line, cutting means on each of said turrets, a bevel cog gear on each of said turrets, a horizontal shaft leading away from each of said gears, a bevel cog gear wheel on each of said shafts meshing with the adjacent bevel gear on the adjacent turret, an upright shaft extending from one of said horizontal shafts to the other, and bevel gear wheels connecting said upright shaft with said horizontal shafts, substantially as described.

4. In a machine of the kind described, the combination of two turrets on a common axial line, cutting means on each of said turrets, a bevel cog gear on each of said turrets, a horizontal shaft leading away from each of said gears, a bevel cog gear wheel on each of said shafts meshing with the adjacent bevel gear on the adjacent turret, an upright shaft extending from one of said horizontal shafts to the other, bevel gear wheels connecting said upright shaft with said horizontal shafts, and operator-controlled means for turning one of said shafts, substantially as described.

5. In a machine of the kind described, the combination of two turrets on a common axial line, cutting means on each of said turrets, a bevel cog gear on each of said turrets, a horizontal shaft leading away from each of said gears, a bevel cog gear wheel on each of said shafts meshing with the adjacent bevel gear on the adjacent turret, an upright shaft extending from one of said horizontal shafts to the other, bevel gear wheels connecting said upright shaft with said horizontal shafts, and operator-controlled worm gearing for turning one of said shafts, substantially as described.

6. In a machine of the kind described, the combination of two turrets on a common axial line, cutting means on each of said turrets, a bevel cog gear on each of said turrets, a horizontal shaft leading away from each of said gears, a bevel gear wheel on each of said shafts meshing with the adjacent bevel gear on the turret, an upright shaft extending from one of said horizontal shafts to the other, bevel gear wheels connecting said upright shaft with said horizontal shafts, and operator-controlled means for turning said upright shaft, substantially as described.

7. In a machine of the kind described, the combination of two turrets on a common axial line, cutting means on each of said turrets, a bevel cog gear on each of said turrets, a horizontal shaft leading away from each of said gears, a bevel gear wheel on each of said shafts meshing with the adjacent bevel gear on the adjacent turret, an upright shaft extending from one of said horizontal shafts to the other, bevel gear wheels connecting said upright shaft with said horizontal shafts, and operator-controlled worm gearing for turning said upright shaft, substantially as described.

8. In a machine of the kind described, the combination of two turrets on a common axial line, cutting means on each of said turrets, means consisting of shafts and cog gearing for turning said turrets in unison, and operator-controlled means for raising and lowering one of said turrets, substantially as described.

9. In a machine of the kind described, the combination of two turrets on a common axial line, cutting means on each of said turrets, means consisting of shafts and cog gearing for turning said turrets in unison, operator-controlled means for turning one of said shafts, and operator-controlled means for raising and lowering one of said turrets, substantially as described.

10. In a machine of the kind described, the combination of two turrets on a common axial line, cutting means on each of said turrets, means consisting of shafts and cog gearing for turning said turrets in unison, operator-controlled worm gearing for turning one of said shafts, and operator-controlled means for raising and lowering one of said turrets, substantially as described.

11. In a machine of the kind described, the combination of two turrets on a common axial line, cutting means on each of said turrets, means consisting of shafts and cog gearing for turning said turrets in unison, and operator-controlled means for horizontally adjusting the cutting means on one of the turrets, substantially as described.

12. In a machine of the kind described, the combination of two turrets on a common axial line, cutting means on each of said turrets, means consisting of shafts and cog gearing for turning said turrets in unison, operator-controlled means for turning one of said shafts, and operator-controlled means for horizontally adjusting the cutting means on one of the turrets, substantially as described.

13. In a machine of the kind described, the combination of two turrets on a common axial line, cutting means on each of said turrets, means consisting of shafts and cog gearing for turning said turrets in unison, operator-controlled worm gearing for turning one of said shafts, and operator controlled means for horizontally adjusting the cutting means on one of the turrets, substantially as described.

14. In a machine of the kind described, the combination of two turrets on a common axial line, cutting means on each of said turrets, operator-controlled means for turning said turrets in unison, a turret shaft on the axial line of the upper turret, a sleeve surrounding said shaft and engaging said turret and exteriorly screw-threaded, a wheel interiorly screw-threaded and surrounding and engaging the threaded part of said sleeve and having its periphery provided with gear teeth, and operator-controlled means for engaging said teeth for turning said wheel whereby said sleeve and the turret are raised or lowered, substantially as described.

15. In a machine of the kind described, the combination of two turrets on a common axial line, cutting means on each of said turrets, operator-controlled means for turning said turrets in unison, a turret shaft on the axial line of the upper turret, a sleeve surrounding said shaft and engaging said turret and exteriorly screw-threaded, a wheel interiorly screw-threaded and surrounding and engaging the threaded part of said sleeve and having its periphery provided with gear teeth, and an operator-controlled gear worm engaging said teeth for turning said wheel whereby said sleeve and the turret are raised or lowered, substantially as described.

16. In a machine of the kind described, the combination of two turrets on a common axial line, an upright turret shaft in one of said turrets, a housing attached to the lower end of the turret to permit horizontal adjustment of the housing on the turret, an upright transmitting shaft seated in the upper part of said housing, a coupling having sliding members joining said shaft to the adjacent end of the turret shaft, cutting means on the lower part of said housing, and gearing intervening said transmitting shaft and the cutting means for actuating said means, substantially as described.

17. In a machine of the kind described, the combination of two turrets on a common axial line, an upright turret shaft in one of said turrets, a housing attached to the lower end of the turret to permit horizontal adjustment of the housing on the turret, an oblique cutter shaft having two bearings and supporting a cutter, and gearing extending from the turret shaft to the cutter shaft between its bearings, substantially as described.

18. In a machine of the kind described, the combination of two turrets on a common axial line, an upright turret shaft in one of said turrets, a housing attached to the lower end of the turret to permit horizontal adjustment of the housing on the turret, an oblique cutter shaft in the lower part of the housing, a cutter on said shaft, an upright transmitting shaft in operative relation with the turret shaft, a secondary upright shaft parallel to the transmitting shaft, and cog gearing connecting the secondary shaft with the transmitting shaft and with the cutter shaft, substantially as described.

19. In a machine of the kind described, the combination of two turrets on a common axial line, an upright turret shaft in one of said turrets, a housing attached to the lower end of the turret to permit horizontal adjustment of the housing on the turret and the housing extending upward into the turret, cutting means on the lower part of said housing, and means extending through the turret and said housing for actuating the cutting means, substantially as described.

20. In a machine of the kind described, the combination of an upright turret bearing, a turret endwise slidable in said bearing, an annular supporting plate supported in the upper part of said bearing, a gear wheel having an interiorly screw-threaded hub, and an exteriorly screw-threaded sleeve extending through and fitted into said hub and having its lower end in engagement with the turret, whereby turning said gear wheel will cause the raising or lowering of the turret in the turret bearing, substantially as described.

21. In a machine of the kind described, the combination of an upright turret bearing, a turret endwise slidable in said bearing, an annular supporting plate supported on the upper part of said bearing, a gear wheel having an interiorly screw-threaded hub, an exteriorly screw-threaded sleeve extending through and fitted into said hub and having on its lower end a flange, and a ring on the turret above and in engagement with said flange, whereby turning said gear wheel will cause the raising or lowering of the turret in the turret bearing, substantially as described.

22. In a machine of the kind described, the combination of two turrets on a common axial line, an upright turret shaft in one of said turrets, the lower end of said shaft having engagement with the turret for limiting downward movement of the turret, and means at the upper end of said shaft to limit downward movement of the shaft, substantially as described.

23. In a machine of the kind described, the combination of an upright turret bearing, a turret endwise slidable in said bearing, an annular supporting plate supported in the upper part of said bearing, a gear wheel having an interiorly screw-threaded hub, an exteriorly screw-threaded sleeve extending through and fitted into said hub and having its lower end in engagement with the turret, whereby turning said gear wheel will cause the raising or lowering of the turret in the turret bearing, a turret shaft having its lower end in engagement with the turret for limiting downward movement of the turret, and means at the upper end of said shaft for limiting downward movement of the shaft, substantially as described.

24. In a machine of the kind described, the combination of an upright turret bearing, a turret rotatable in said bearing and having a circumferential lubricant channel and a port leading from said channel into the interior of the turret, and said bearing having a port positioned to discharge lubricant into said circumferential channel, substantially as described.

25. In a machine of the kind described, the combination of two turrets on a common axial line, a shaft extending horizontally and transversely through the machine and bearing a gear worm in operative relation with one of said turrets for turning the turret, and operator-controlled means on each end of said shaft for turning said shaft, substantially as described.

26. In a machine of the kind described, the combination of two turrets on a common axial line, cutting mechanism on each of said turrets, a horizontal shaft in operative relation with the upper turret for actuating the cutting mechanism on said turret, another horizontal shaft in operative relation with the other turret for actuating the cutting mechanism on said turret, an upright shaft having its ends in operative relation with said horizontal shafts, a horizontal drive shaft in operative relation with said upright shaft, a hand wheel and a shiftable clutch member on the drive shaft, a rocking lever for controlling said shiftable clutch member, a bell crank pivoted on the machine, a bar coupled to said bell crank and the outer end of the rocking arm and extending slidably through a bearing on the machine, a spring on said bar tending to shift the latter for rocking the rocking lever to move said clutch member out of engagement, and a pedal mechanism connected with said bell crank, substantially as described.

27. In a machine of the kind described, the combination of two turrets on a common axial line, cutting mechanism on each of said turrets, a horizontal shaft in operative relation with the upper turret for actuating the cutting mechanism on said turret, another horizontal shaft in operative relation with the other turret for actuating the cutting mechanism on said turret, an upright shaft having its ends in operative relation with said horizontal shafts, a horizontal drive shaft in operative relation with said upright shaft, a hand wheel and a shiftable clutch member on the drive shaft, a rocking lever for controlling said shiftable clutch member, a bell crank pivoted on the machine, a bar coupled to said bell crank and the outer end of the rocking arm and extending slidably through a bearing on the machine, a spring on said bar tending to shift the latter for rocking the rocking lever to move said clutch member out of engagement, a pedal mechanism connected with said bell crank, and brake means adjacent the shiftable clutch member and against which said clutch member rests when said member is out of its working position, substantially as described.

In testimony whereof I have signed my name, this 20th day of December, in the year one thousand nine hundred and twenty-four.

CHARLES B. GRAY.